a patented May 15, 1962

3,034,200
CORROSION RESISTANT ALUMINUM BASE MATERIAL
William E. Tragert, Scotia, N.Y., assignor to General Electric Company, a corporation of New York
No Drawing. Filed June 19, 1959, Ser. No. 821,372
1 Claim. (Cl. 29—182.5)

This invention relates to sintered metal compacts made of finely divided materials and more particularly to such bodies containing principally aluminum and smaller admixtures of other powders imparting improved corrosion resistance to the aluminum in high temperature water.

Commercially pure aluminum in the form of sheet, plate, bar, rod, and wire has become one of the more widely used engineering materials. This material, commonly designated as "2S," is composed of at least 99 percent aluminum, and is the aluminum material with which the present invention is principally concerned, although aluminum of about 98 percent purity is also included. Alloying agents, such as iron, copper, manganese and zinc, among others, may be present up to the 2 percent limit. However, as structural materials were subjected to higher and higher temperatures and to increasingly corrosive environments, the use of substantially pure aluminum bodies necessarily declined.

The first effort to overcome the physical and chemical deficiencies of cast bodies of commercial aluminum resulted in the preparation of sintered aluminum bodies made up of finely divided particles of aluminum and predetermined amounts of aluminum oxide as a second phase dispersion. This development resulted in increased structural properties but no notable increase in the resistance of the sintered bodies to corrosion in high temperature water environments.

It is therefore a principal object of this invention to provide a coherent sintered metal-metal oxide body of comparatively high mechanical strength and which is resistant to corrosion in high temperature water.

Additional objects and advantages of this invention will be in part obvious and in part explained by reference to the accompanying specification.

Generally, the present invention is concerned with bodies made of finely divided powder metals, specifically, commercially pure aluminum, niobium oxide, and selected amounts of silica not exceeding the amount of niobium oxide present. The silica may be omitted for some applications if desired, although it is generally preferred that some be included in the final body. These bodies have excellent resistance to corrosion by high temperature water, even where the water is not in a static condition, at temperatures up to the critical point of water, viz., about 372° C.

To produce bodies according to the present invention, selected amounts of finely divided, powdered aluminum, niobium oxide ($Nb_2O_5$) and silica ($SiO_2$), are measured according to the percentages desired, thoroughly mixed, pressed and subsequently sintered into an integral body. The powders are normally of $-325$ mesh particle size, although the size is determined primarily by powder metallurgy considerations so that a certain amount of freedom is permitted in selecting the particular mesh used. Of course, to insure acceptable mixing of the powders, they should all be of approximately the same particle size so that the niobium and silicon oxides are evenly distributed throughout the aluminum matrix after sintering.

As a specific example, several bodies were made by mixing $-325$ mesh commercially pure aluminum with 5 weight percent of $-325$ mesh niobium oxide and 5 weight percent of silica powder, also of $-325$ mesh size. The powders were thoroughly mixed by adding a liquid such as alcohol to the dry powders and forming a fluid mass in order that blending in a mechanical mixing apparatus could be readily effected. After the powders had been blended, they were permitted to dry and powder compacts or bodies were formed by cold pressing. This was accomplished by compressing the mixed powders at room temperature in a 1⅛ inch diameter cylindrical closed die under a pressure of 20 tons per square inch to form a cylindrical compact having a diameter of 1⅛ inches. It should be noted that the size of the die, the liquid mixing medium, the particular mechanical apparatus used and the pressure used to form the compact are not critical and that changes may be made as well known in the art.

The green compact was then hot pressed in a cylindrical closed die of the same size as that used in cold pressing and the temperature raised to within the range of from 250 to 600° C. The particular temperature chosen in the present instance was about 550° C. and a force of about 20 tons per square inch was used. Generally speaking, temperatures at the upper end of the range are to be preferred since they permit a more rapid densification of the compact within a shorter period of time.

The bodies produced in the manner just described were subjected to corrosion tests in static and flowing water heated to a temperature of about 350° C. to determine the effects of the additions.

One test of 260-hour duration at 350° C. in which the water was static resulted in a corrosion rate of about 5 mils per year after the initial reaction. Other bodies of similar compositions were tested for periods of 744 hours in water heated to 350° C. under both static and flowing conditions. Corrosion rates of about 8 mils per year were obtained. Additional samples of the same composition, that is, commercial aluminum containing 5 percent niobium oxide and 5 percent silica and subjected to flowing water at 350° C. for periods ranging from 500 to 744 hours, had average corrosion rates of about 4 mils per year. It is apparent that the corrosion rates of these materials indicate substantial inertness to the corrosive environment when compared to the corrosion resistance of previously existing sintered aluminum materials, the latter materials normally disintegrating when subjected to water at temperatures on the order of 300° C. for lesser time periods.

Generally speaking, the amount of niobium oxide and silica present in any given body should be such that the ratio of silica to niobium oxide never becomes less than one to one, that is to say, it is preferred that the amount of silica present in any given sintered body never appreciably exceed the amount of niobium oxide present, if the desired corrosion resistance is to be imparted to the final body. For example, sintered bodies of the following compositions were prepared in the manner previously described and tested for periods ranging upward to 500 hours in water heated to 350° C., under both static and flowing conditions. The alloys are: 2 percent niobium oxide, 5 percent silica; 2 percent niobium oxide, 8 percent silica; 4 percent niobium oxide, 5 percent silica; and 4 percent niobium oxide, 8 percent silica. The balance of the composition consisted entirely of commercially pure aluminum.

In all cases, the corrosion rates of the bodies were such that the material was rendered completely useless and no well-defined corrosion rate could be determined. This is true even of the body containing 4 percent niobium and 5 percent silica which contained only 1 percent less niobium oxide than the preferred composition mentioned earlier in the specification. The criticality of the ratio between the niobium oxide and silica amounts present in the sintered bodies thus becomes apparent.

Although the amount of silica cannot exceed the amount of niobium oxide present and still obtain a body having useful corrosion resistant properties, it is possible to reduce the amount of silica below the amount of niobium oxide present and still obtain the desired protective effect. In fact, the silica can be omitted and niobium oxide used solely if so desired, although somewhat improved properties are obtained by adding some silica.

It is obvious that the present invention provides a sintered, aluminum-base body having vastly improved corrosion-resistant properties rendering it extremely useful in high temperature water applications, an application which has heretofore not been possible due to the extremely corrosive effect of high temperature water on the aluminum.

What I claim as new and desire to secure by Letters Patent of the United States is:

A coherent sintered metal-metal oxide body resistant to corrosion by flowing water at elevated temperatures comprising, a matrix consisting of sintered commercially pure aluminum particles, and an evenly distributed dispersion consisting of about 5 weight percent niobium oxide and 5 weight percent silica to protect said body against corrosion in water up to about the critical temperature of the water.

References Cited in the file of this patent
UNITED STATES PATENTS
2,840,891   Nachtman _____ July 1, 1958